United States Patent
Nagai et al.

(10) Patent No.: US 6,988,425 B2
(45) Date of Patent: Jan. 24, 2006

(54) ACTUATOR

(75) Inventors: Shigekazu Nagai, Adachi-ku (JP); Akio Saitoh, Kawaguchi (JP); Masaru Saitoh, Mitsukaido (JP)

(73) Assignee: SMC Kabushiki Kaisha, Tokyo (JP)

( * ) Notice: Subject to any disclaimer, the term of this patent is extended or adjusted under 35 U.S.C. 154(b) by 220 days.

(21) Appl. No.: 10/449,535

(22) Filed: Jun. 2, 2003

(65) Prior Publication Data
US 2003/0224890 A1    Dec. 4, 2003

(30) Foreign Application Priority Data
Jun. 4, 2002    (JP)    ............................. 2002-162637

(51) Int. Cl.
F16H 7/18     (2006.01)
F16H 29/12    (2006.01)
F16H 27/10    (2006.01)

(52) U.S. Cl. .................. 74/89.32; 74/89.2; 474/144

(58) Field of Classification Search ................ 74/89.2, 74/89.21, 490.01, 490.04, 89.15; 318/9–14; 198/84; 384/42–45; 474/144, 148
See application file for complete search history.

(56) References Cited

U.S. PATENT DOCUMENTS

| | | | |
|---|---|---|---|
| 4,582,371 A * | 4/1986 | Mottate | 384/45 |
| 5,027,666 A * | 7/1991 | Filicetti | 74/89.2 |
| 5,186,545 A * | 2/1993 | Shirai | 74/89.2 |
| 5,345,832 A * | 9/1994 | Takei | 74/490.09 |
| 5,445,045 A * | 8/1995 | Nagai et al. | 74/490.09 |
| 5,720,202 A * | 2/1998 | Senjo et al. | 74/89.36 |
| 6,344,718 B1 * | 2/2002 | Nagai et al. | 318/14 |
| 6,571,932 B1 * | 6/2003 | Kawashima et al. | 198/494 |
| 2003/0172755 A1 * | 9/2003 | Nagai et al. | 74/89.2 |
| 2003/0217610 A1 * | 11/2003 | Nagai et al. | 74/89.2 |

FOREIGN PATENT DOCUMENTS

| | | | | |
|---|---|---|---|---|
| JP | 40-5065947 A | * | 3/1993 | ............... 74/89.2 |
| JP | 9-119438 | | 5/1997 | |
| JP | 11-30234 | | 2/1999 | |

OTHER PUBLICATIONS

Copending U.S. Appl. No. 10/000,349 filed Dec. 4, 2001 by Shigekazu Nagai et al.
Copending U.S. Appl. No. 10/108,901 filedMar. 29, 2002 by Shigekazu Nagai et al.
Copending U.S. Appl. No. 10/135,712 filedMay 1, 2002 by Shigekazu Nagai et al.
NOTE: An English language abstract of Japanese citation 11-30234 provided to serve as a partial translation thereof.

* cited by examiner

Primary Examiner—Marcus Charles
(74) Attorney, Agent, or Firm—Paul A. Guss

(57) ABSTRACT

An actuator comprises a driving force-transmitting mechanism which includes a belt member running over a driving pulley and a driven pulley, and a guide mechanism which includes a plurality of balls which rolls along first ball-rolling grooves formed on a frame, and second ball-rolling grooves formed on a slider. The guide mechanism guides the slider when the slider is displaced along the frame.

22 Claims, 16 Drawing Sheets

PRIOR ART

ACTUATOR

BACKGROUND OF THE INVENTION

1. Field of the Invention

The present invention relates to an actuator which allows a slider to perform a rectilinear reciprocating motion along a frame under the driving action of a driving source.

2. Description of the Related Art

A transport means such as an actuator has been hitherto used, for example, in order to transport a workpiece.

A conventional actuator is shown in FIGS. 15 and 16 (see, for example, Japanese Laid-Open Patent Publication No. 11-30234).

The conventional actuator 1 includes a slider 4 which is displaceable along a recess 3 of a track rail 2, and a screw shaft 6 which is driven by an unillustrated driving motor and which is screwed together with a nut member 5 that is detachable with respect to the slider 4. Screw shaft supports 7a, 7b, which rotatably support the screw shaft 6, are provided at both ends of the screw shaft 6. The screw shaft supports 7a, 7b are attached on an upper surface 8 of the track rail 2.

However, in the conventional actuator 1 as described above, the slider 4 is displaced by converting the rotary motion of the screw shaft 6 into the rectilinear motion of the slider 4 by nut member 5. Therefore, even if the screw shaft 6 is rotated at a high speed, it is difficult to greatly increase the displacement speed to displace the slider 4 at a high speed.

Further, there is a demand to realize an actuator smaller in size and lighter in weight to meet the installation requirements of individual users.

SUMMARY OF THE INVENTION

A general object of the present invention is to provide an actuator which makes it possible to realize a high displacement speed of a slider, and to realize an apparatus smaller in size and lighter in weight.

According to the present invention, a driving force-transmitting mechanism, by which a slider is displaced in accordance with the rotary action of a belt member running over a driving pulley and a driven pulley, is combined with a guide-integrated frame. The guide-integrated frame includes first ball-rolling grooves formed on the frame. Accordingly, it is possible to realize a high displacement speed of the slider, and to realize an apparatus smaller in size and lighter in weight as compared with a conventional actuator.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
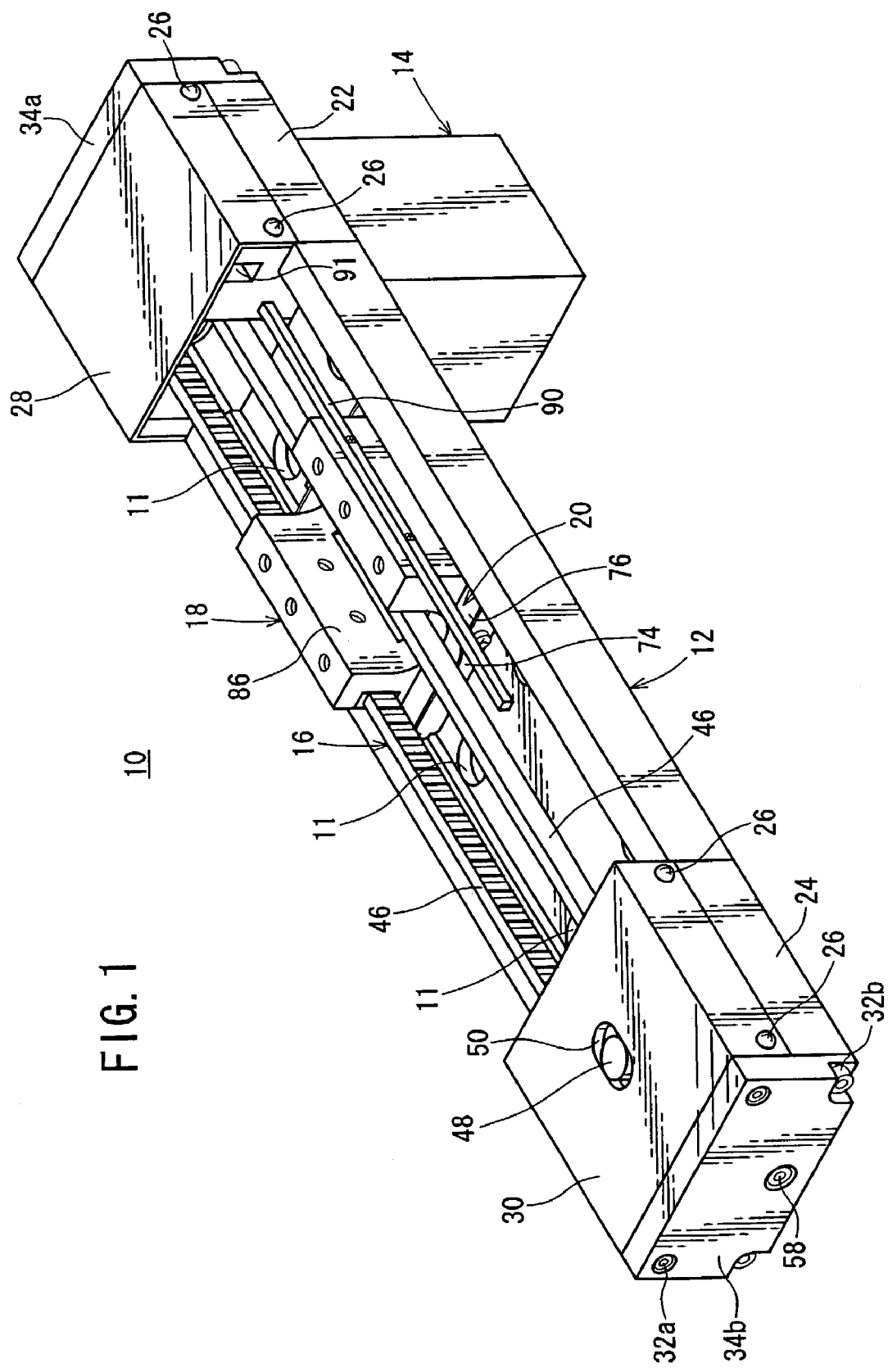
FIG. 1 is a perspective view illustrating an actuator according to a first embodiment of the present invention.

With reference to FIG. 1, reference numeral 10 indicates an actuator according to a first embodiment of the present invention.

The actuator 10 comprises a frame 12, which includes a bottom wall section with a plurality of attachment holes 11 formed thereon and a pair of mutually opposing folded sections, and a rotary driving source 14, which is provided at one end of the frame 12.

The actuator 10 further comprises a driving force-transmitting mechanism 16 which converts the rotary driving force of the rotary driving source 14 into the rectilinear motion to be transmitted, a slider 18 which reciprocates in the axial direction of the frame 12 in accordance with the rectilinear motion transmitted by the driving force-transmitting mechanism 16, a guide mechanism 20 (see FIG. 7) which guides the slider 18 along the frame 12, and a sensor mechanism 21 for detecting, for example, the displacement amount and terminal positions of the slider 18.

It is preferable that each of the frame 12 and the slider 18 is formed of a metal material such as stainless steel, aluminum, or aluminum alloy, and the frame 12 is integrally formed, for example, by means of the extrusion or the pultrusion.

Figure 2:
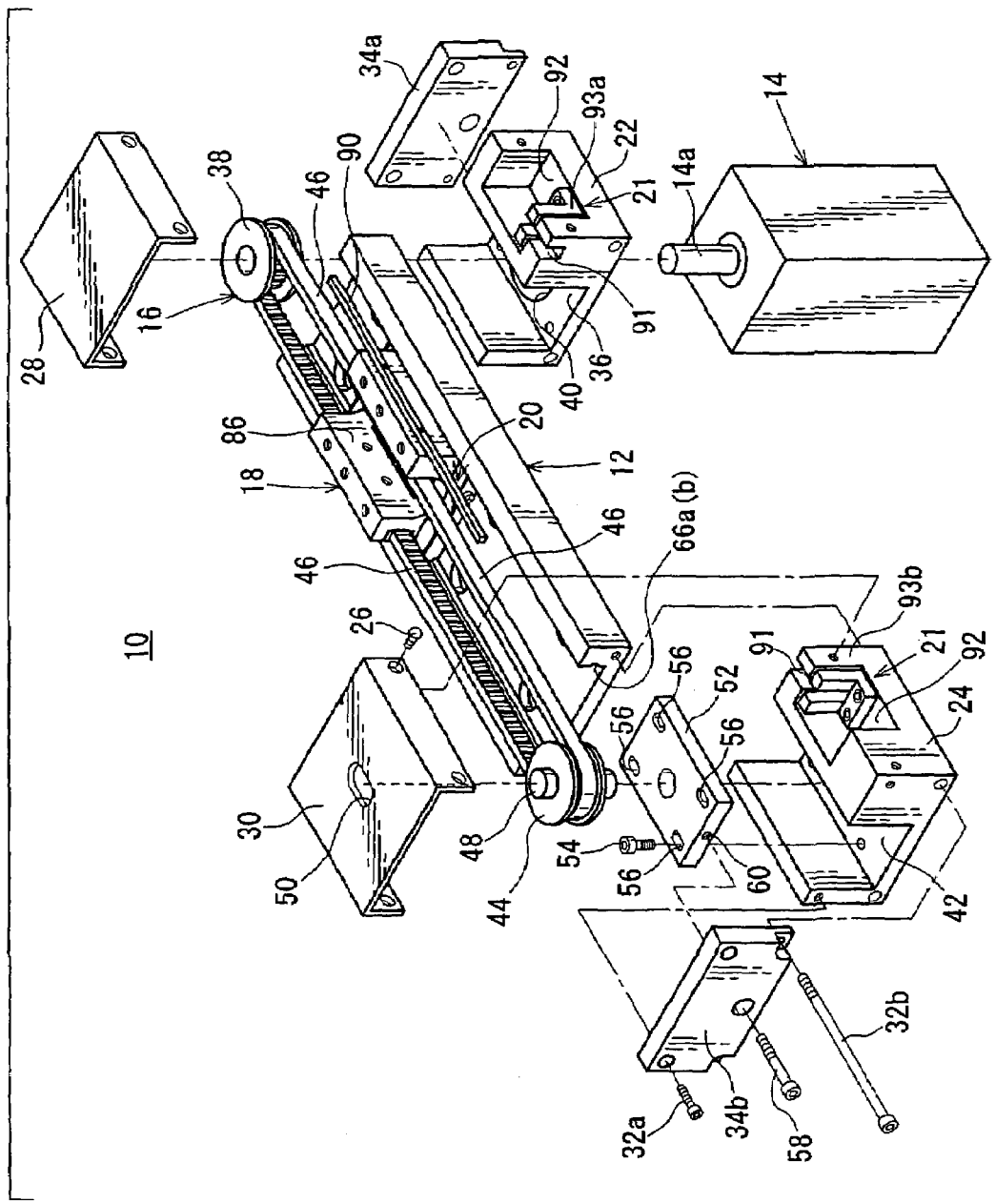
FIG. 2 is an exploded perspective view illustrating the actuator.

A first housing 22 is integrally connected to one end of the frame 12 in the axial direction. A second housing 24 is integrally connected to the other end of the frame 12 in the axial direction. As shown in FIGS. 1 and 2, the first housing 22 and the second housing 24 are provided with a first cover member 28 and a second cover member 30 which are detachably installed by screw members 26, and a pair of end plates 34a, 34b connected by a pair of screw members 32a, 32b having different lengths.

Figure 4:
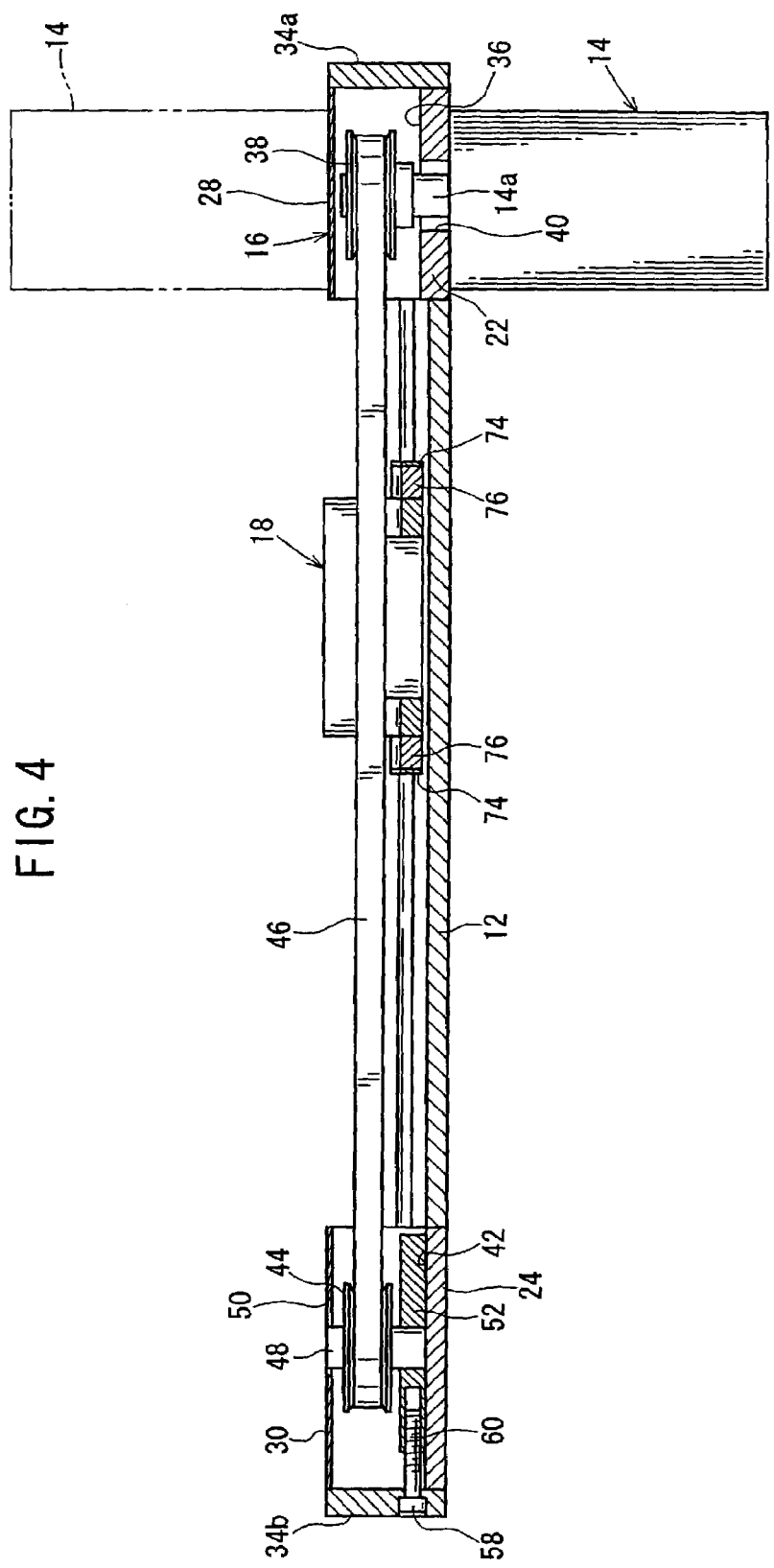
FIG. 4 is a longitudinal sectional view taken along a line IV—IV shown in FIG. 3.

The rotary driving source 14 is fastened to the bottom surface of the first housing 22 by unillustrated screw members. The position of the rotary driving source 14 is not limited to the location on the bottom surface of the first housing 22. As indicated by a two-dot chain line shown in FIG. 4, the rotary driving source 14 may be connected to the upper surface of the first housing 22. Either one of the positions described above may be selected depending on the installation environment.

A driving pulley 38 is rotatably supported in a recess 36 of the first housing 22. The driving pulley 38 is directly connected to a drive shaft 14a of the rotary driving source 14 via a circular opening 40 (see FIGS. 2 and 4). A driven pulley 44 is rotatably supported in a recess 42 of the second housing 24. A belt member 46, which extends substantially in parallel to the axis of the frame 12, runs over the driving pulley 38 and the driven pulley 44.

A columnar pin section 48 is rotatably inserted in the center of the driven pulley 44 as a shaft of the driven pulley 44. A lower end of the pin section 48 is inserted into a hole of a plate 52 fitted in the recess 42 of the second housing 24, and an upper end of the pin section 48 is engaged with a long hole 50 of the second cover member 30. One end of the pin section 48 is supported by the plate 52, and the other end of the pin section 48 is not supported by the second cover member 30 (see FIGS. 2 and 4). The plate 52 is fastened to the recess 42 of the second housing 24 by screw members 54. The plate 52 is displaceable along long holes 56 with which the screw members 54 are engaged.

A regulating screw member 58, which has a head retained by a hole of the end plate 34b, is screwed into a side surface of the plate 52 opposed to the end plate 34b. The regulating screw member 58 regulates the tension of the belt member 46 which is run over the driving pulley 38 and the driven pulley 44. That is, the head of the regulating screw member 58 is rotated, for example, with a hexagon wrench through the exposed side surface of the end plate 34b to adjust the screwing amount of the screw section with respect to a screw hole 60 of the plate 52. Accordingly, the plate 52 is displaced by a minute distance along the recess 42 of the second housing 24. Thus, it is possible to appropriately regulate the tension of the belt member 46.

Figure 3:
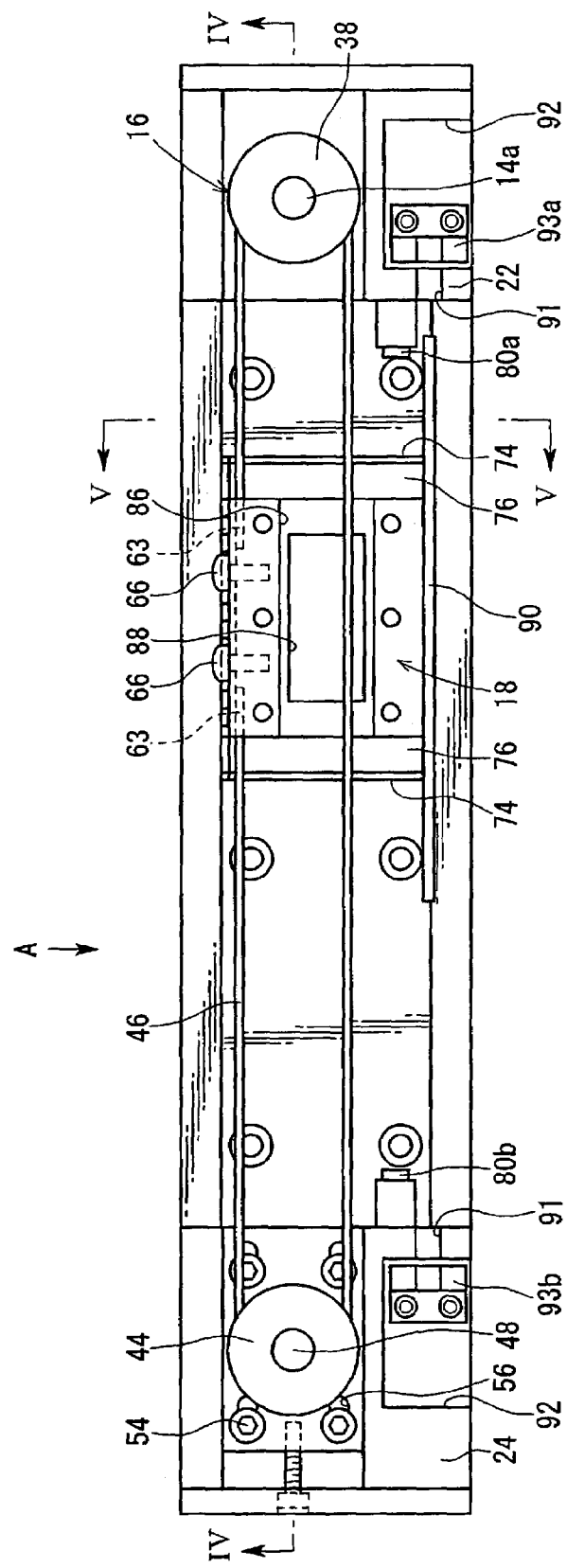
FIG. 3 is a plan view illustrating the actuator.
Figure 5:
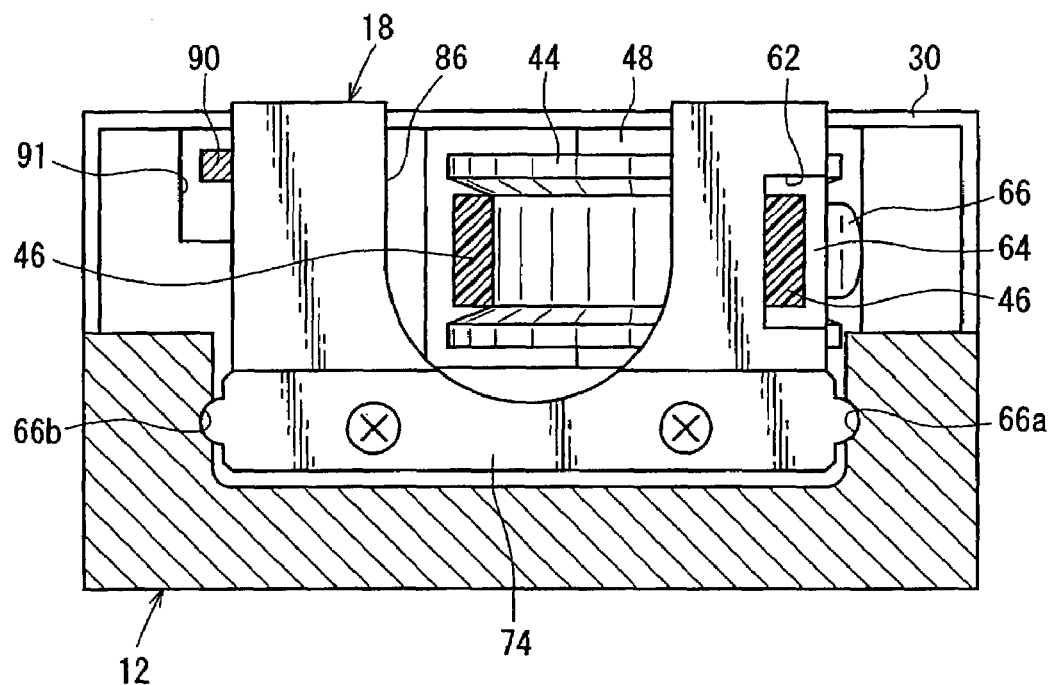
FIG. 5 is a magnified vertical sectional view taken along a line V—V shown in FIG. 3.
Figure 6:
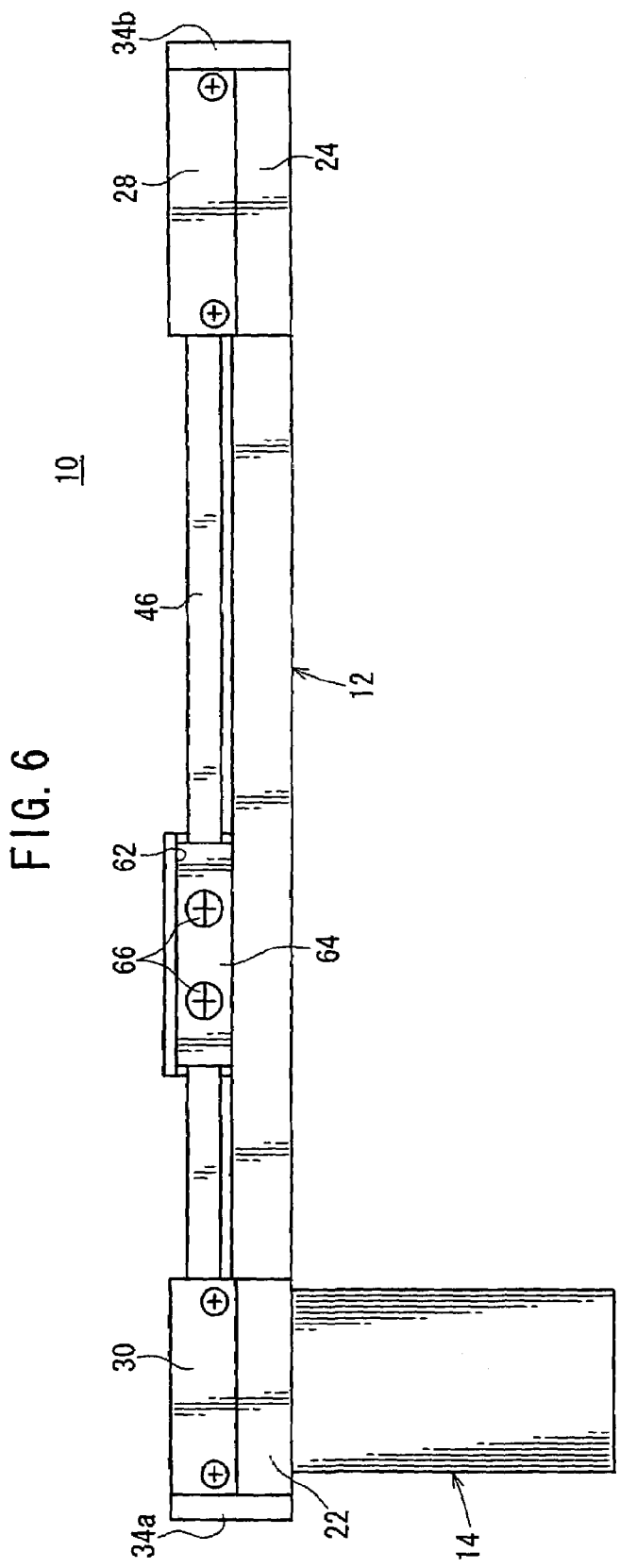
FIG. 6 is a view as viewed in a direction of an arrow A shown in FIG. 3.
Figure 7:
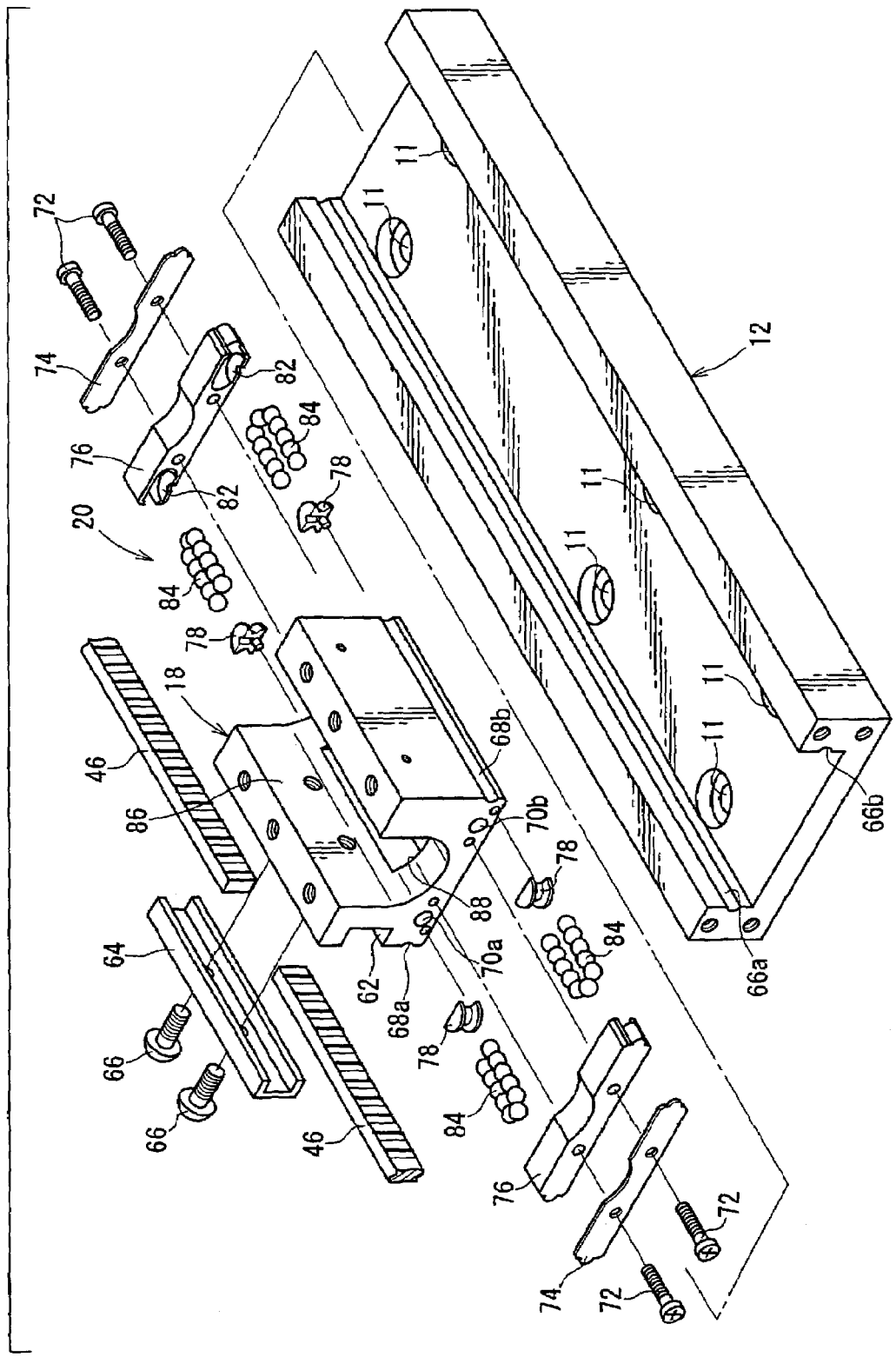
FIG. 7 is an exploded perspective view illustrating a guide mechanism for constructing the actuator.

As shown in FIGS. 5 to 7, a long groove 62 which extends substantially in parallel to the axis, is formed on one side of the slider 18. A pair of teeth sections 63 (see FIG. 3) formed in the long groove 62 are engaged with teeth sections formed on opposite ends of the belt member 46. A belt stopper 64 is installed to the long groove 62 by a pair of bolts 66, and the belt member 46 is retained between the slider 18 and the belt stopper 64. Therefore, the belt member 46 is fixed to the slider 18 so that the belt member 46 is displaced together with the slider 18.

The belt stopper 64 has a pair of opposing bent sections which extend in the axial direction. The belt stopper 64 is detachably installed to the slider 18 by a pair of bolts 66. Further, as shown in FIGS. 5 and 6, the belt stopper 64 can be attached and detached with ease around an upper portion of the side wall of the frame 12 from the outside. Therefore, it is possible, for example to conveniently exchange and maintain the belt member 46 with the slider 18 installed to the frame 12.

As shown in FIG. 7, the guide mechanism 20 includes a pair of opposing first ball-rolling grooves 66a, 66b, a pair of opposing second ball-rolling grooves 68a, 68b and a pair of ball-rolling holes 70a, 70b. The pair of first ball-rolling grooves 66a, 66b extend in the axial direction of the frame 12 at portions close to the bottom surface of the inner wall of the frame 12 and have vertical cross sections in the shape of circular arcs. The pair of second ball-rolling grooves 68a, 68b are formed on the side surfaces of the slider 18 opposite of the inner wall of the frame 12 and have vertical cross sections in the shape of circular arcs. The pair of ball-rolling holes 70a, 70b are disposed closely to the second ball-rolling grooves 68a, 68b and penetrate in the axial direction of the slider 18.

The guide mechanism 20 further includes guide plates 74 and covers 76 which are connected to lower portions of the slider 18 by screw members 72, and return guides 78 which are installed to the side surfaces of the slider 18. It is preferable that each of the guide plate 74, the cover 76, and the return guide 78 is formed of a resin material.

In this arrangement, the guide plates 74 and the covers 76 are installed to the lower portions of the side surfaces of the slider 18. Accordingly, the upper portions of the side surfaces of the slider 18, to which the guide plates 74 and the covers 76 are not installed, can be used as abutment surfaces for dampers 80a, 80b (see FIG. 3).

The guide plates 74, the covers 76, and the return guides 78 are composed of the same parts for both side surfaces of the slider 18 in the axial direction.

Ball return grooves 82 are formed in the covers 76. In this arrangement, endless circulating tracks, in which a plurality of balls 84 roll, are constructed by the first and second ball-rolling grooves 66a, 66b, 68a, 68b, the ball-rolling holes 70a, 70b which are formed on the slider 18, and the ball return grooves 82. The first ball-rolling groove 66a is opposite of the second ball-rolling groove 68a, and the first ball-rolling groove 66b is opposite of the second ball-rolling groove 68b.

As shown in FIGS. 5 and 7, an opening 86, which extends in the axial direction having a U-shaped vertical cross section, is formed in an upper central portion of the slider 18. The opening 86 is a large recess opening upwardly. Thus, the opening 86 functions as a space for the belt member 46 to be appropriately displaced without contacting the slider 18.

As shown in FIG. 7, a rectangular hole 88, which penetrates downwardly from the opening 86, is formed through the slider 18.

As shown in FIG. 2, the actuator 10 has the sensor mechanism 21 including a rod-shaped shielding member 90 extending in a substantially horizontal direction, and a first and second photo sensors 93a, 93b. The shielding member 90 is attached to one side of the slider 18 with screws, and displaceable together with the slider 18. The first photo sensor 93a is provided in a recess 92 of the first housing 22, and the second photo sensor 93b is provided in a recess 92 of the second housing 24. Each of the first housing 22 and the second housing 24 has a cutout 92 for inserting an end of the shielding member 90.

Further, each of the first and second photo sensors 93a, 93b includes a light-emitting element and a light-receiving element spaced from the light-emitting element by a predetermined distance for receiving a light emitted from the light-emitting element. Therefore, when the end of the shielding member 90 which is displaced together with the slider 18 is positioned between the light-emitting member and the light-receiving member, the light emitted from the light-emitting element is shielded by the shielding member 90. At this time, the first and second photo sensors 93a, 93b output a detection signal to a controller (not shown).

Figure 8:
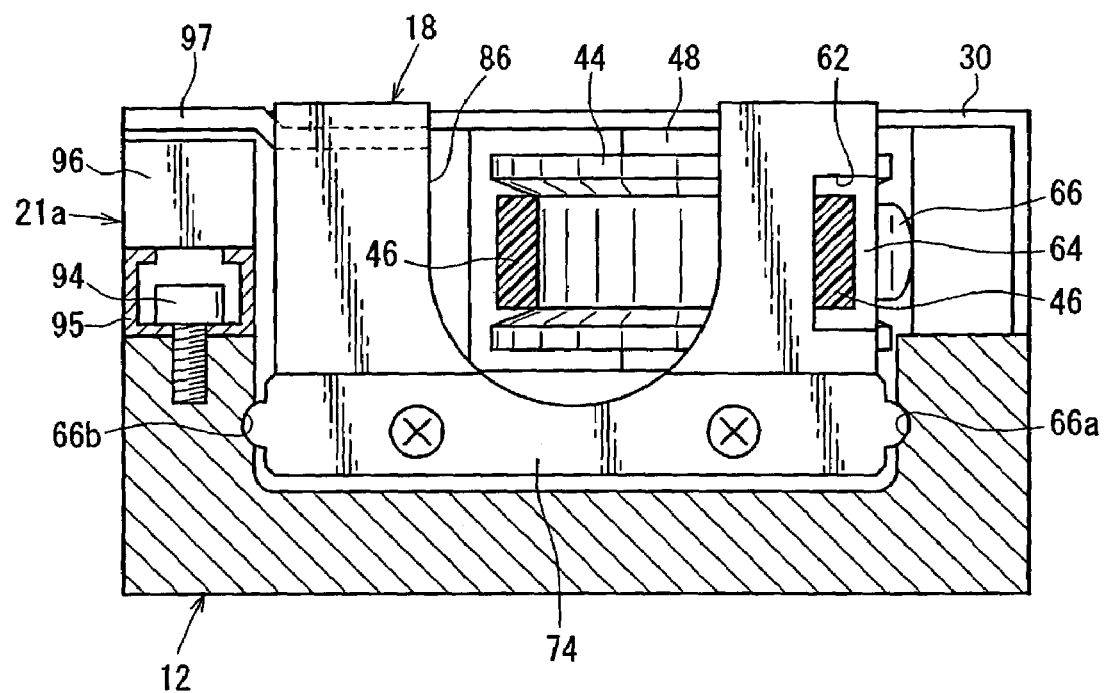
FIG. 8 is a longitudinal sectional view showing a modified example of a sensor mechanism of the actuator.

FIG. 8 shows a sensor mechanism 21a as a modified example. A sensor rail 95 is placed on one side wall of the frame 12 using a screw member 94. A proximity sensor 96 is provided along the sensor rail 95. The proximity sensor 96 can be positioned by engagement at an arbitrary position along the sensor rail 95. A magnetic object 97 fixed to the slider 18 is displaceable together with the slider 18. The magnetic force of the magnet object 97 is detected by the proximity sensor 97 for detecting the displacement position of the slider 18.

The actuator 10 according to the first embodiment of the present invention is basically constructed as described above. Next, its operation, function, and effect will be explained.

First, a method for assembling the guide mechanism 20 to the slider 18 will be explained.

The pair of guide plates 74 and the covers 76 are installed to each of the end surfaces of the slider 18 by screw members 72, and the slider 18 is assembled into the recess of the frame 12. In this arrangement, the guide plates 74, the covers 76, and the return guides 78, which are composed of the same components, are installed to both ends of the slider 18 in the axial direction. Therefore, the guide plate 74, the cover 76, and other components can be installed from either end of the slider 18.

In other words, by using identical constitutive members on both sides of the slider 18 in the axial direction, these members can be assembled thereon conveniently regardless of the side of the slider 18. Further, by using the same parts for constructing the guide mechanism 20, it is possible to reduce the number of parts, and to reduce the production cost.

Next, the operation of the actuator 10 will be explained.

When an unillustrated power source is energized, the driving pulley 38, which is connected to the drive shaft 14a of the rotary driving source 14, is driven and rotated, and the rotary motion of the driving pulley 38 is transmitted to the belt member 46 which runs over the driving pulley 38 and the driven pulley 44. Therefore, the slider 18, to which the belt member 46 is fastened by the belt stopper 64, is displaced in the axial direction of the frame 12 under the guiding action of the guide mechanism 20. Meanwhile, when the polarity of the current flowing through the rotary driving source 14 is reversed, the slider 18 reciprocates in the axial direction of the frame 12.

When the slider 18 reciprocates in the axial direction of the frame 12, the plurality of balls 84 roll along the first ball-rolling grooves 66a, 66b and the second ball-rolling grooves 68a, 68b. Accordingly, the slider 18 can be smoothly displaced along the frame 12.

In the first embodiment, the belt member 46, which runs over the driving pulley 38 and the driven pulley 44, is used as the driving force-transmitting mechanism 16, and the belt member 46 is fastened to the slider 18 to displace the belt member 46 together with the slider 18. Accordingly, it is possible to realize a high displacement speed of the slider 18.

In the first embodiment, the driving force-transmitting mechanism 16, in which the slider 18 is displaced in accordance with the rotary motion of the belt member 46 running over the driving pulley 38 and the driven pulley 44, is combined with the guide-integrated frame in which the first ball-rolling grooves 66a, 66b are formed on the frame 12. Accordingly, it is possible to realize an apparatus smaller in size and lighter in weight as compared with a conventional actuator.

In other words, in the first embodiment, the driving force-transmitting mechanism 16, which comprises, for example, the belt member 46, is arranged inside the guide mechanism 20 which comprises, for example, the first and second ball-rolling grooves 66a, 66b, 68a, 68b. Accordingly, it is possible to realize a small and light weighted apparatus.

A driving mechanism such as an unillustrated rodless cylinder or a fluid pressure-operated cylinder may be used in place of the rotary driving source 14.

Further, the position of the shielding member 90 is detected by one of the photo sensor 93a in the first housing 22 and the photo sensor 93b in the second housing 24. Since the shielding member 90 is displaced together with the slider 18, the initial position of the slider 18 can be detected.

Further, an unillustrated sensor may be installed to the side surface of the frame 12 to detect an unillustrated member to be detected which is connected to the slider 18 and which is displaceable together with the slider 18. Accordingly, it is possible to detect the home position.

Additionally, in the first embodiment, the first ball-rolling grooves 66a, 66b of the frame 12 are arranged in two substantially horizontal arrays. Accordingly, as compared with a case in which the ball-rolling grooves are arranged in four arrays, the size of the side portion of the frame 12 in the height direction can be reduced thus increasing the rigidity.

Figure 9:
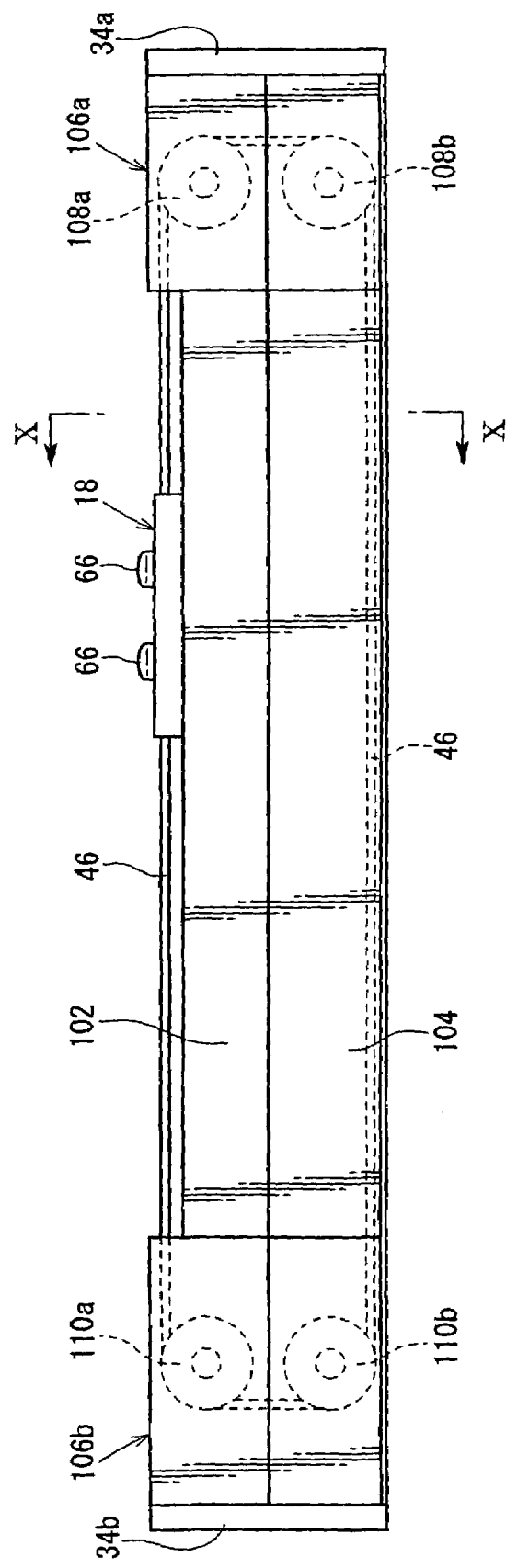
FIG. 9 is a front view illustrating an actuator according to a second embodiment of the present invention.
Figure 10:
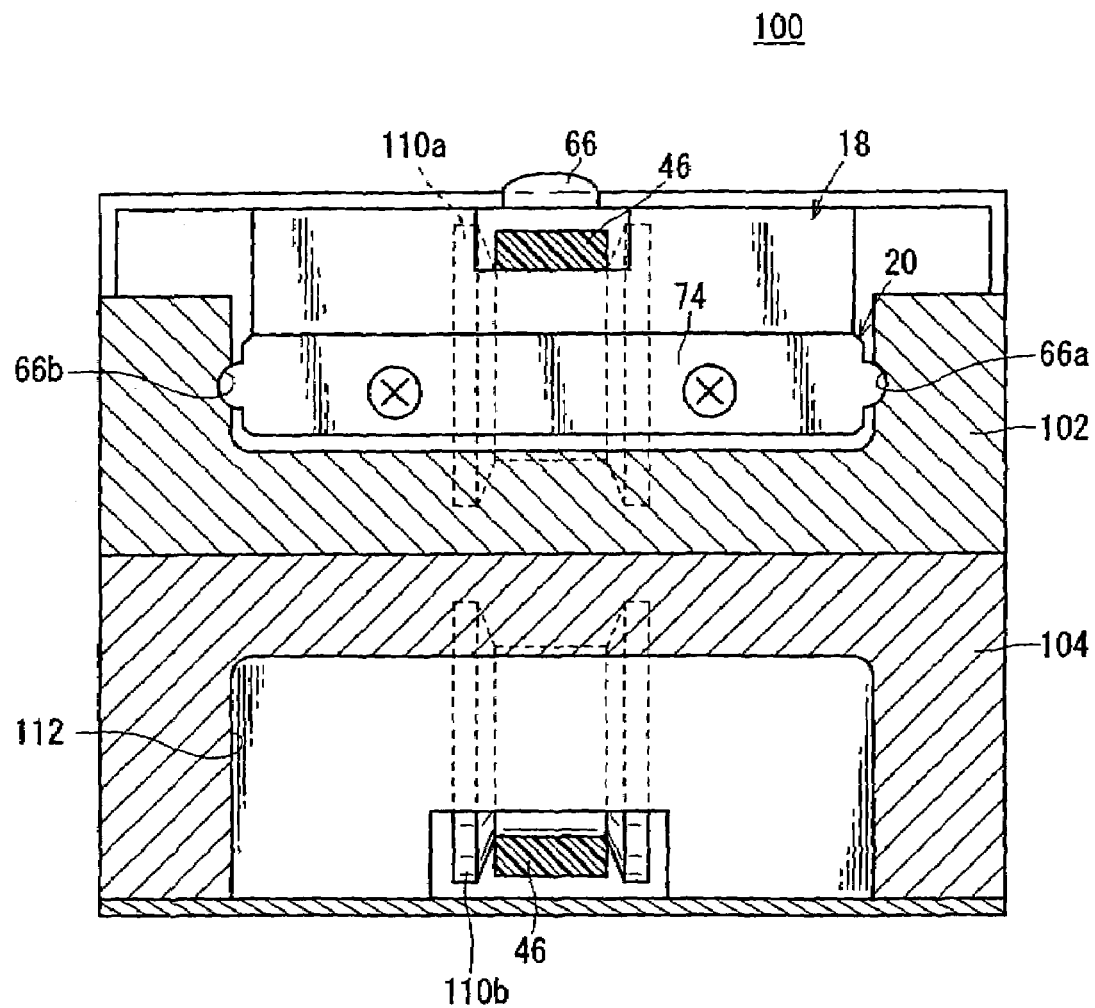
FIG. 10 is a magnified vertical sectional view taken along a line X—X shown in FIG. 9.

Next, an actuator 100 according to a second embodiment of the present invention is shown in FIGS. 9 and 10. The same constituent elements as those of the actuator 10 according to the first embodiment shown in FIG. 1 are designated by the same reference numerals, and detailed explanations will be omitted.

The actuator 100 according to the second embodiment has the following features. An upper first frame 102 and a lower second frame 104 are connected to one another. Pairs of pulleys 108a, 108b and 110a, 110b are arranged substantially in parallel in the vertical direction in housings 106a, 106b which are connected to both ends of the first frame 102 and the second frame 104. Thus, four pulleys 108a, 108b, 110a, 110b are used in the second embodiment.

As shown in FIG. 10, the guide mechanism 20 including, for example, the first ball-rolling grooves 66a, 66b is provided on the upper first frame 102. The slider 18 is displaced along the recess of the first frame 102 smoothly under the guiding action of the guide mechanism 20. A hollow space section 112, through which the belt member 46 is displaceable, is formed on the lower second frame 104.

The actuator 100 according to the second embodiment can be used as a long stroke type in which the displacement amount of the slider 18 is large. Further, the belt member 46 has an increased number of teeth with which the belt member 46 is meshed with the pair of upper pulleys 108a, 110a. The pair of upper pulleys 108a, 110a are separated from each other by a predetermined distance, owing to the warp caused by the weight of the belt member 46. With the increased numbers of teeth, it is possible to appropriately transmit the rotary driving force from the pulleys 108a, 110a to the belt member 46.

Figure 11:
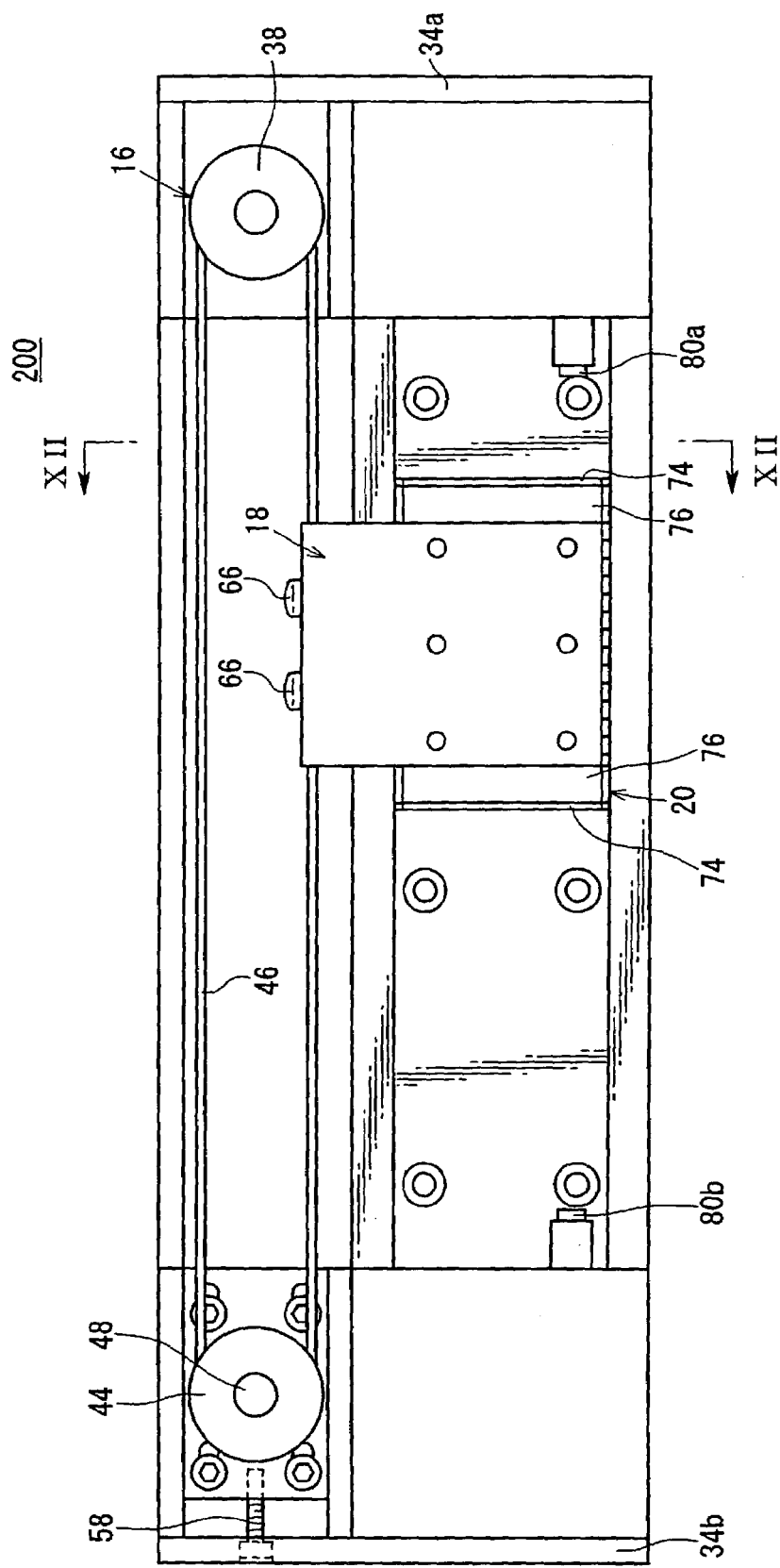
FIG. 11 is a plan view illustrating an actuator according to a third embodiment of the present invention.
Figure 12:
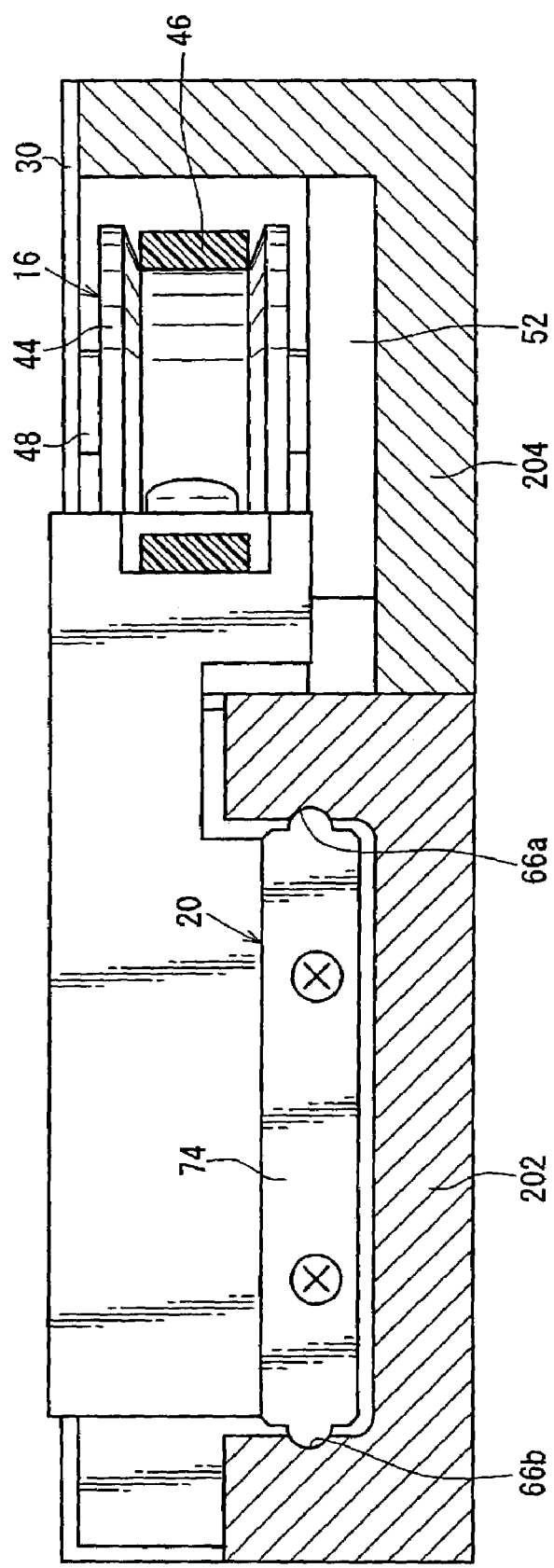
FIG. 12 is a magnified vertical sectional view taken along a line XII—XII shown in FIG. 11.

Next, an actuator 200 according to a third embodiment of the present invention is shown in FIGS. 11 and 12.

The actuator 200 according to the third embodiment has the following features. A first frame 202 having a pair of opposite side portions formed in a folded manner and a second frame 204 having an L-shaped cross section are juxtaposed in an integrated manner in the horizontal direction. Further, the guide mechanism 20, which is arranged in the first frame 202, is constructed separately from the driving force-transmitting mechanism 16, which is arranged in the second frame 204.

In the actuator 200 according to the third embodiment, the guide mechanism 20 and the driving force-transmitting mechanism 16 are constructed separately in parallel to each other. Accordingly the maintenance operation can be easily performed, and the size in the height direction can be reduced.

Figure 13:
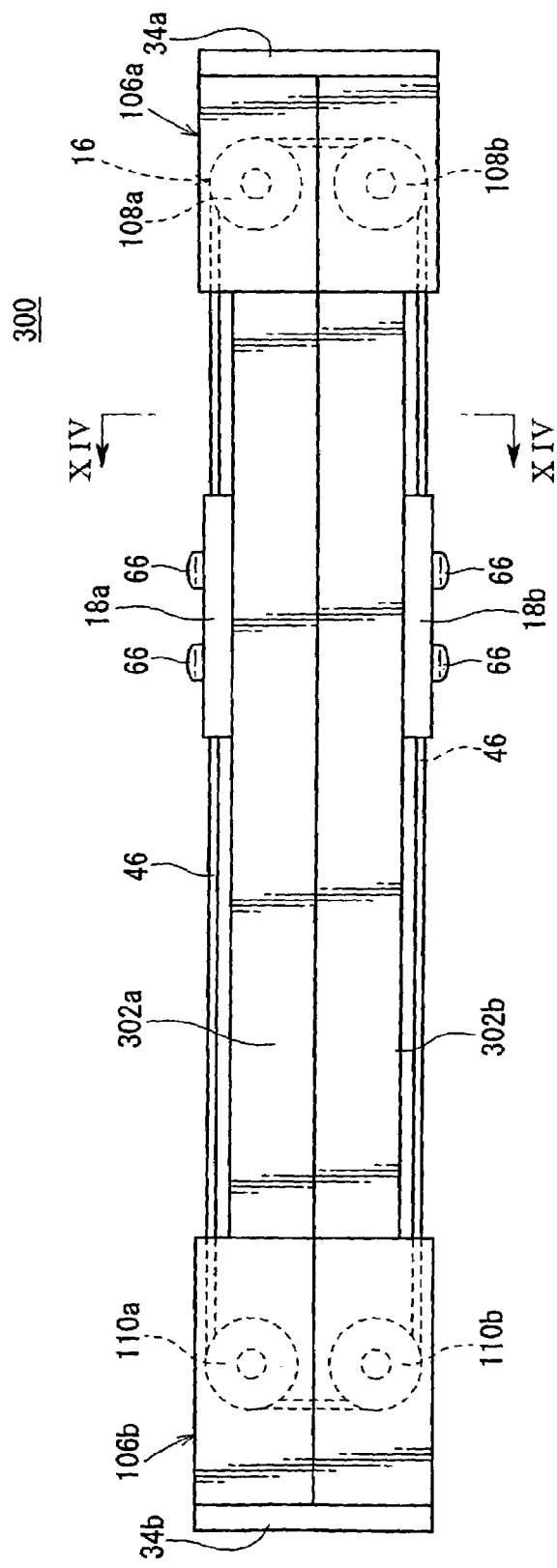
FIG. 13 is a front view illustrating an actuator according to a fourth embodiment of the present invention.
Figure 14:
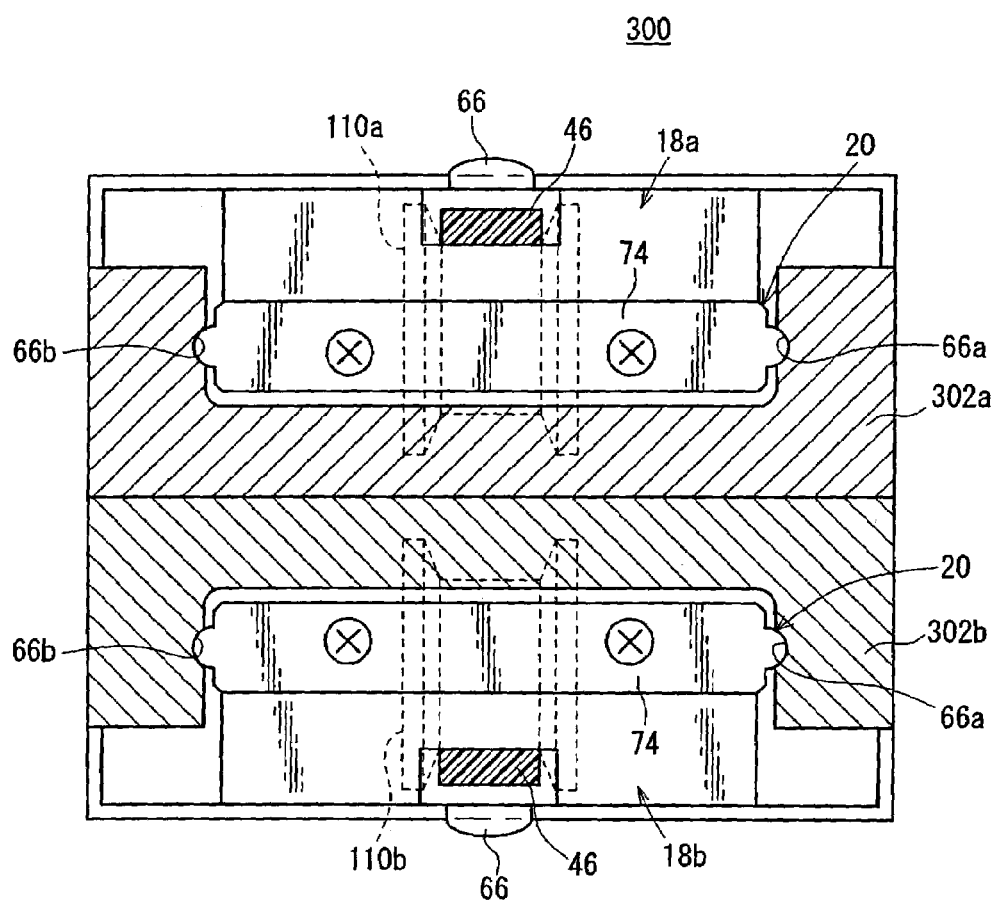
FIG. 14 is a magnified vertical sectional view taken along a line XIV—XIV shown in FIG. 13.
Figure 15:
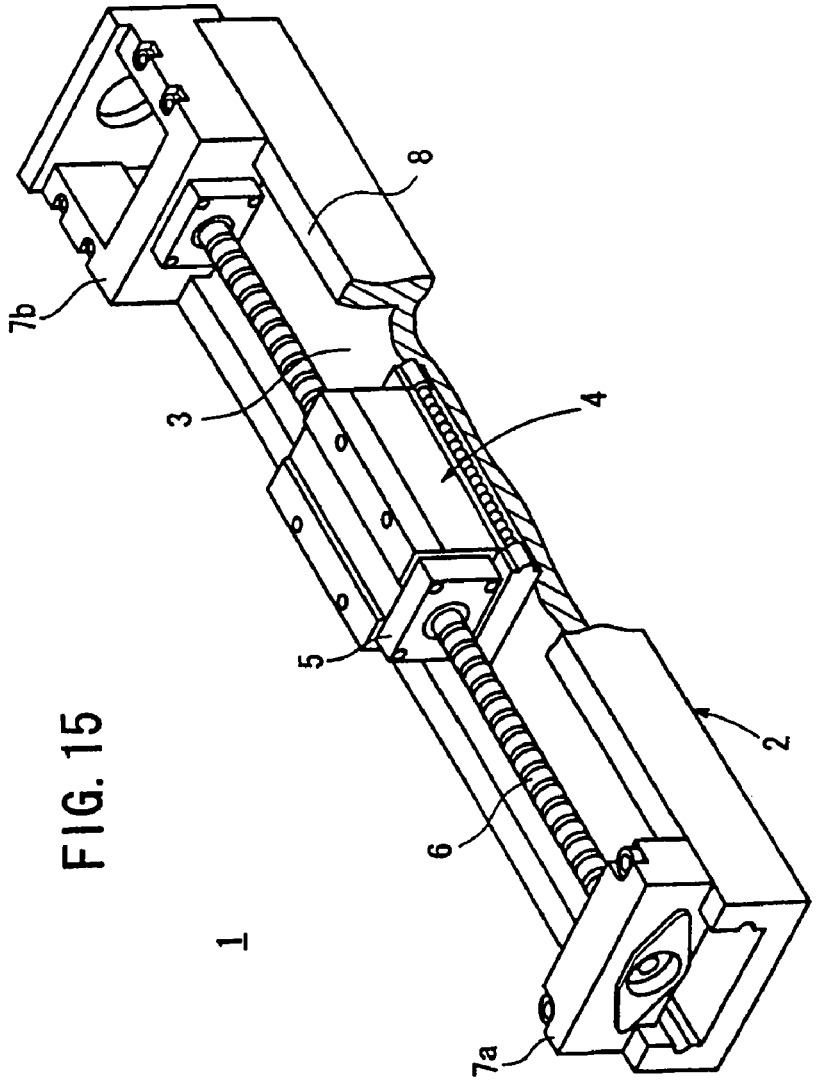
FIG. 15 is, with partial cutout, a perspective view illustrating an actuator of the conventional technique.
Figure 16:
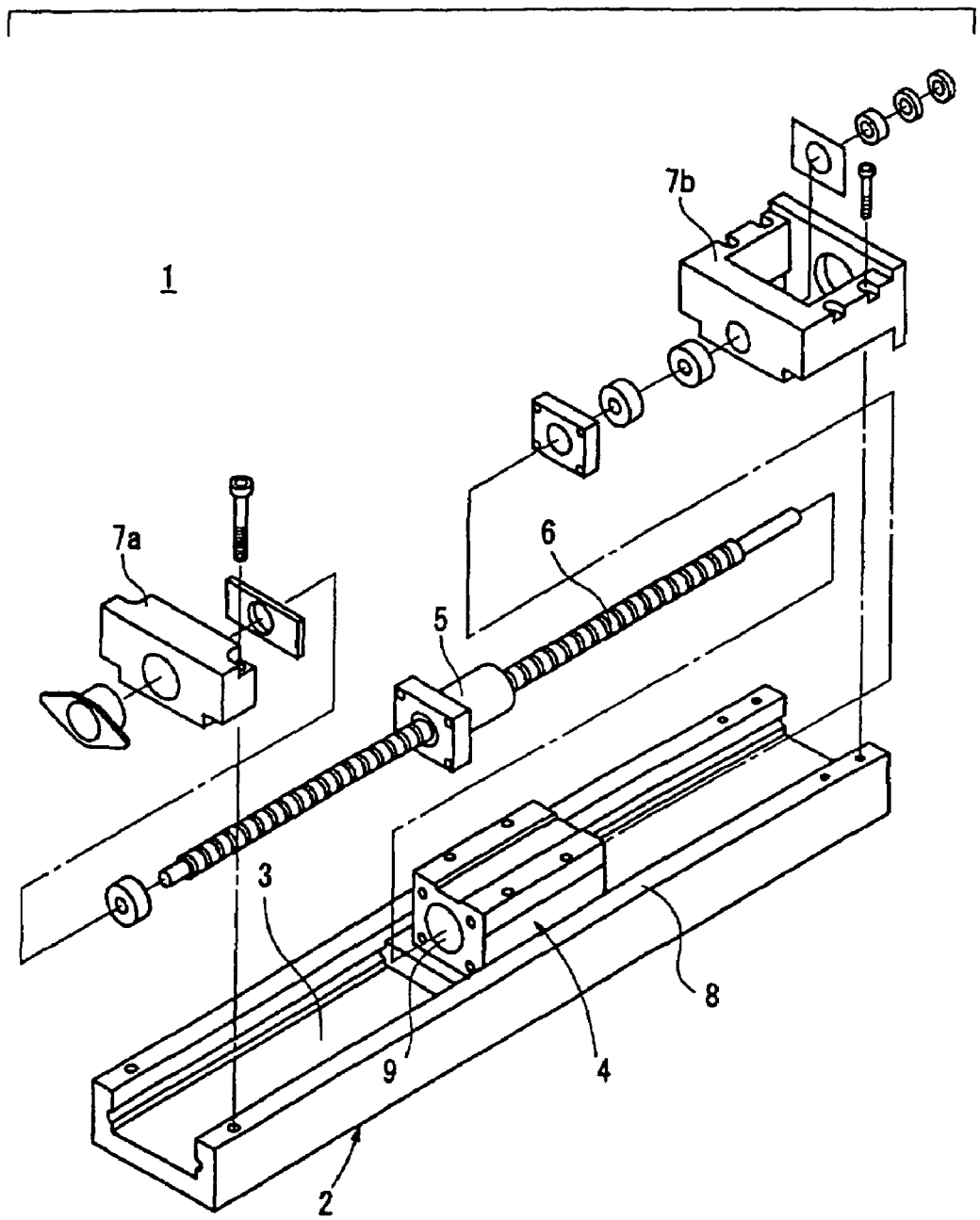
FIG. 16 is an exploded perspective view illustrating the actuator of the conventional technique.

Next, an actuator 300 according to a fourth embodiment of the present invention is shown in FIGS. 13 and 14.

The actuator 300 according to the fourth embodiment has the following features. A first frame 302a and a second frame 302b, in which the guide mechanisms 20 and the driving force-transmitting mechanisms 16 are arranged, are connected to one another in the vertical direction. A pair of sliders 18a, 18b are simultaneously driven. The other constituent elements are provided in the same manner as the actuator 100 shown in FIGS. 9 and 10.

The first frame 302a and the second frame 302b, in which the guide mechanisms 20 and the driving force-transmitting mechanisms 16 are arranged, may be connected to one another in the horizontal direction rather than in the vertical direction.

Although certain preferred embodiments of the present invention has been shown and described in detail, it should be understood that various changes and modifications may be made therein without departing from the scope of the appended claims.

What is claimed is:

1. An actuator comprising:
  a frame;
  a driving source which is arranged inside or outside said frame;
  a driving force-transmitting mechanism which includes a driving pulley rotatably supported on one end of said frame, a driven pulley rotatably supported on the other end of said frame, and a belt member running over said driving pulley and said driven pulley;
  a slider to which said belt member is fastened and which reciprocates in an axial direction of said frame together with said belt member in accordance with rotary motion of said belt member;
  a guide mechanism which includes a plurality of balls rolling along first ball-rolling grooves formed on said frame and second ball-rolling grooves formed on said slider, and which guides said slider when said slider is displaced along said frame; and
  a belt stopper which is installed to a groove formed on said slider to fasten said belt member to said slider, wherein said belt stopper is installed detachably to said slider such that said belt stopper and fastening members of said belt stopper are visible and accessible from outside of said frame.

2. The actuator according to claim 1, wherein said belt member of said driving force-transmitting mechanism is arranged inside said frame inwardly of said plurality of balls and said first and second ball-rolling grooves.

3. The actuator according to claim 1, further comprising a plate which rotatably supports said driven pulley, wherein tension of said belt member running over said driving pulley and said driven pulley is regulated by displacing said plate, said plate is displaced by increasing and decreasing a screwing amount of a regulating screw member to be screwed into a screw hole of said plate.

4. The actuator according to claim 1, wherein said guide mechanism includes a guide plate, a cover, and a return guide.

5. The actuator according to claim 4, wherein said guide plate, said cover, and said return guide are connected to a lower portion of a side surface of said slider in said axial direction.

6. The actuator according to claim 1, wherein said slider is formed with an opening through which said belt member is displaceable.

7. The actuator according to claim 8, wherein said opening has a U-shaped vertical cross section.

8. The actuator according to claim 1, wherein said driving force-transmitting mechanism and said guide mechanism are arranged separately in parallel.

9. The actuator according to claim 1, further comprising a sensor mechanism for detecting displacement of said slider, wherein said sensor mechanism includes a shielding member and a pair of photo sensors for detecting said shielding member, said shielding member is attached to one side of said slider and displaceable together with said slider, and said photo sensors are provided in a pair of housings attached to opposite ends of said frame.

10. The actuator according to claim 1, further comprising a sensor mechanism for detecting displacement of said slider, wherein said sensor mechanism includes a magnetic object and a proximity sensor for detecting a magnetic force of said magnetic object, said magnetic object is attached to one side of said slider and displaceable together with said slider, and said proximity sensor is provided on a side wall of said frame and freely displaceable along a sensor rail.

11. The actuator according to claim 1, wherein teeth sections are formed in said groove, which engage with teeth sections formed on opposite ends of said belt member.

12. An actuator comprising:
  a frame;
  a driving source which is arranged inside or outside said frame;
  a driving force-transmitting mechanism which includes a driving pulley rotatably supported on one end of said frame, a driven pulley rotatably supported on the other end of said frame, and a belt member running over said driving pulley and said driven pulley;
  a slider to which said belt member is fastened and which reciprocates in an axial direction of said frame together with said belt member in accordance with rotary motion of said belt member; and
  a guide mechanism which includes a plurality of balls rolling along first ball-rolling grooves formed on said frame and second ball-rolling grooves formed on said slider, and which guides said slider when said slider is displaced along said frame,
  further comprising a sensor mechanism for detecting displacement of said slider, wherein said sensor mechanism includes a shielding member and a pair of photo sensors for detecting said shielding member, said shielding member is attached to one side of said slider and displaceable together with said slider, and said photo sensors are provided in a pair of housings attached to opposite ends of said frame.

13. The actuator according to claim 12, further comprising a belt stopper which is installed to a groove formed on said slider to fasten said belt member to said slider.

14. The actuator according to claim 13, wherein teeth sections are formed in said groove, which engage with teeth sections formed on opposite ends of said belt member.

15. The actuator according to claim 13, wherein said belt stopper is installed detachably to said slider such that said belt stopper and fastening members of said belt stopper are visible and accessible from outside of said frame.

16. The actuator according to claim 12, wherein said belt member of said driving force-transmitting mechanism is arranged inside said frame inwardly of said plurality of balls and said first and second ball-rolling grooves.

17. The actuator according to claim 12, further comprising a plate which rotatably supports said driven pulley, wherein tension of said belt member running over said driving pulley and said driven pulley is regulated by displacing said plate, said plate is displaced by increasing and decreasing a screwing amount of a regulating screw member to be screwed into a screw hole of said plate.

18. The actuator according to claim 12, wherein said guide mechanism includes a guide plate, a cover, and a return guide.

19. The actuator according to claim 18, wherein said guide plate, said cover, and said return guide are connected to a lower portion of a side surface of said slider in said axial direction.

20. The actuator according to claim 12, wherein said slider is formed with an opening through which said belt member is displaceable.

21. The actuator according to claim 20, wherein said opening has a U-shaped vertical cross section.

22. The actuator according to claim 12, wherein said driving force-transmitting mechanism and said guide mechanism are arranged separately in parallel.

* * * * *